No. 776,430. Patented November 29, 1904.

UNITED STATES PATENT OFFICE.

ADOLPHE SEIGLE, OF LYON-MONPLAISIR, FRANCE.

ARTIFICIAL BUILDING MATERIAL.

SPECIFICATION forming part of Letters Patent No. 776,430, dated November 29, 1904.

Application filed March 7, 1903. Serial No. 146,727. (No model.)

*To all whom it may concern:*

Be it known that I, ADOLPHE SEIGLE, a citizen of France, residing at Lyon-Monplaisir, France, have invented certain new and useful Artificial Building Materials, of which the following is a full, clear, and exact description.

The invention relates to the manufacture of artificial building materials in which the chemical combination of silica with lime is obtained by the action of steam under pressure. One of the principal if not the most serious of the practical difficulties or difficulties of management presented by this manufacture in its regular and economic industrial working is to bring the mixture of sand and lime to sufficient plasticity and cohesion to enable it to be well molded, which should precede its intense hardening in autoclaves or in closed vessels under steam-pressure. In effect, inasmuch as argillaceous materials used in potteries are after grinding, mixing, &c., readily moldable, so far is it difficult to properly mold and at the same time sufficiently solidly agglomerate mixtures of sand and lime unless when using slaked lime in paste or when greatly wetting these mixtures, which latter gives rise to very grave inconveniences of different kinds. Besides, this real and great practical difficulty in the manufacture of bricks or monoliths in autoclaves or in closed vessels under steam-pressure is well known to manufacturers, as well as that equally serious one of obtaining a complete and very regular slaking of the lime.

The process forming the subject of the present invention has for its object to solve at the same time practically and simply the two above-named difficulties of practical working.

The following is the procedure adopted:

Good quicklime is used, which is as pure as possible. It is crushed, pulverized, and screened, taking care to avoid rendering it too fine. Sand is used which is sufficiently strong in silica or other silicious matter more or less pulverulent. It is necessary that the degree of humidity of the sand should be as low as possible. If even the sand were very dry, it would be better. In any case its hygrometric degree should be exactly known. By the aid of a suitable apparatus for this purpose of any known description the following materials are introduced into a good mixing-machine of any known kind—namely: first, determined proportions of sand and of pulverized quicklime—say, for example, about ninety-two to ninety-five per cent., by weight, of sand to five to eight per cent., by weight, of quicklime; second, a hot solution of chlorid of calcium containing from about thirty to sixty grams of this salt per liter of water, the said solution being introduced in sufficient proportion so that by being added to the water contained in the sand it first produces the normal and complete hydration of the lime and in addition a supplement to very slightly dilute or temper the mass and that more or less according to the original hygrometric condition of the sand.

By the single fact of placing in simultaneous and fractional contact, first, silicious sand; second, quicklime, and, third, water combined with chlorid of calcium there is obtained, first, the absolutely complete slaking of the lime, so to say, instantaneously; second, the rapid and perfectly uniform thermochemical heating of all the elements present. This intense and, so to say, molecular heating promotes the commencement of the chemical combination between the silica of the sand and the lime, which renders the mass gradually homogeneous and of a cohesion and very sufficient plasticity. This combination will require after molding only to be completely under the action of steam under pressure, as usual. If desired, the reaction of the silica on the lime may be allowed to continue beyond the moment of the complete slaking of the lime, and also it may be aided by surrounding the mixing-machine with a heating-jacket or with steam circulation. By this means the plasticity of the mixture will be further increased. The plasticity can also be increased by previously adding to the powder of quicklime about ten to fifteen per cent. of powder of calcined calamin or an equivalent quantity of oxid of zinc. In the course of time there is formed by reaction with the chlorid of calcium a double oxid of zinc and calcium which possesses very active agglomerating properties.

The employment of oxid of zinc greatly facilitates the operation of mixing, which thus becomes realizable with a very rudimentary plant. In effect it suffices to first pour the necessary quantity of sand into a mixer of any known description, then to add from about five to ten per cent. of powder of quicklime combined with oxid of zinc, and to cause the apparatus to turn for a period of from five to ten minutes, so as to thoroughly mix the sand and lime. The operation is continued during a further ten to fifteen minutes, during which the solution of chlorid of calcium is poured little by little into the mixer. According to whether the envelop of the mixer is cold or hot the apparatus is continued to be turned for a longer or shorter time or simply the necessary reactions are allowed to take place. In any case, even in winter and without heating, this operation never lasts longer than from thirty to forty minutes.

Having fully described my invention, what I claim, and desire to secure by Letters Patent, is—

A process for manufacturing artificial stones consisting in taking dry trituration of determined quantities of lime and of calcined calamin or oxid of zinc in powder form, and incorporating this mixture in a large quantity of silicious matter, subjecting the mass thus obtained to a slow and methodical humectation through a spread solution of chlorid of calcium and mixing the mass together, until a sufficiently-plastic paste is obtained, then casting into molds and finally removing it from the molds and subjecting it to the action of steam under pressure to harden the same.

In witness whereof I have hereunto set my hand in presence of two witnesses.

ADOLPHE SEIGLE.

Witnesses:
GASTON JEANNIAUX,
MARIN VACHORY.